(12) United States Patent
Janhunen et al.

(10) Patent No.: US 8,322,162 B2
(45) Date of Patent: Dec. 4, 2012

(54) METHOD OF HEATING GLASS PANELS FOR TEMPERING AND APPARATUS APPLYING THE METHOD

(75) Inventors: Toivo Janhunen, Kangasala (FI); Tarmo Pesonen, Lempäälä (FI)

(73) Assignee: Glaston Services Ltd. Oy, Tampere (FI)

( * ) Notice: Subject to any disclaimer, the term of this patent is extended or adjusted under 35 U.S.C. 154(b) by 766 days.

(21) Appl. No.: 10/558,677

(22) PCT Filed: Mar. 16, 2005

(86) PCT No.: PCT/FI2005/050088
§ 371 (c)(1),
(2), (4) Date: Jan. 24, 2006

(87) PCT Pub. No.: WO2005/097694
PCT Pub. Date: Oct. 20, 2005

(65) Prior Publication Data
US 2006/0248924 A1    Nov. 9, 2006

(30) Foreign Application Priority Data
Apr. 7, 2004  (FI) ...................... 20045128

(51) Int. Cl.
*C03B 27/00* (2006.01)

(52) U.S. Cl. ............... 65/114; 65/111; 65/273; 432/145; 432/136; 432/121; 219/368; 219/400; 219/411

(58) Field of Classification Search .................. None
See application file for complete search history.

(56) References Cited

U.S. PATENT DOCUMENTS

| | | | | |
|---|---|---|---|---|
| 3,406,021 A | * | 10/1968 | Day et al. | 65/474 |
| 6,045,358 A | * | 4/2000 | Kormanyos | 432/145 |
| 6,064,040 A | | 5/2000 | Muller et al. | |
| 6,845,633 B2 | | 1/2005 | Vitkala | |
| 2003/0061834 A1 | | 4/2003 | Vitkala et al. | |

FOREIGN PATENT DOCUMENTS

| | | |
|---|---|---|
| EP | 0937687 A2 | 8/1999 |
| EP | 1241143 A2 | 9/2002 |
| EP | 1279645 A2 | 1/2003 |
| EP | 1298096 A2 | 4/2003 |
| FI | 106256 | 8/1999 |
| FI | 20020486 A | 9/2002 |
| FI | 20011923 A | 4/2003 |
| WO | WO 2004/024642 A1 | 3/2004 |

* cited by examiner

*Primary Examiner* — Richard Crispino
*Assistant Examiner* — Phu H Nguyen
(74) *Attorney, Agent, or Firm* — Buchanan Ingersoll & Rooney PC

(57) ABSTRACT

The invention relates to a method of heating glass panels for tempering. The horizontal glass panels are heated in a lehr by upper and lower convection blast and by upper and lower radiation heating, information representing a load of the glass panels and used for the control and/or regulation of heating is read, the upper radiation heating is controlled and/or regulated in the way of a matrix by a profiling both in a conveying direction and a direction lateral thereto. At least the upper convection blast is controlled and/or regulated in various sections of the lehr in the way of a matrix by a profiling both in a conveying direction and a direction lateral thereto, and the relative blast effects of convection blowing elements successive in the conveying direction are regulated for a profiling in the conveying direction. The invention relates also to an apparatus applying the method.

2 Claims, 3 Drawing Sheets

METHOD OF HEATING GLASS PANELS FOR TEMPERING AND APPARATUS APPLYING THE METHOD

Figure 1:
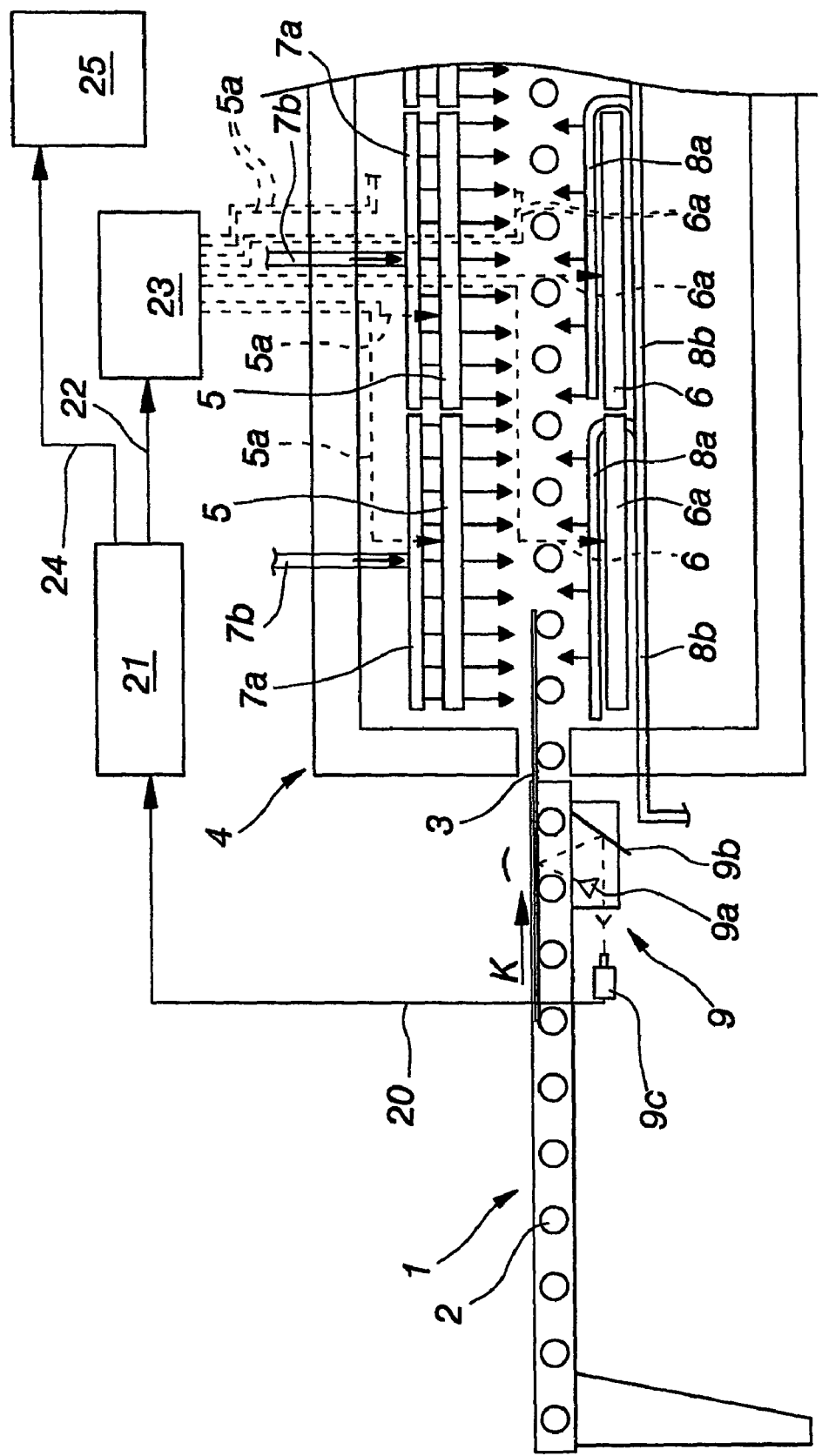

The present invention relates to a method of heating glass panels for tempering, said method comprising heating horizontal glass panels by upper and lower convection blast and by upper and lower radiation heating, reading information that represents a load of the glass panels and that is used for the control and/or regulation of heating, controlling and/or regulating the upper radiation heating in the way of a matrix by a profiling both in a conveying direction and in a direction lateral thereto.

In addition, the present invention relates to an apparatus for heating glass panels for tempering, said apparatus comprising horizontal conveyor rolls, upper and lower convection blast elements and upper and lower radiation heating elements, a detector capable of reading information that represents a load of the glass panels, control devices for controlling and/or regulating the convection blast elements and radiation heating elements by means of the load-representing information, and said upper and lower radiation heating elements being divided in a conveying direction and in a direction lateral thereto into segments which have their heating effects adapted to be independently controlled and/or regulated.

This type of method and apparatus are known from the Applicant's patent application FI 20020486, wherein the top and bottom sides of a glass panel are heated with convection fans. The latter constitute convection heating zones side by side in the lateral direction of a tempering furnace, which zones are only able to provide a profiling that is transverse to the conveying direction. A similar type of apparatus is also disclosed in the Applicant's patent application FI 20011923.

This type of method and apparatus are capable of heating also the bottom side of glass in a profiled manner in a direction lateral to the conveying direction. A drawback is that production is relatively inflexible. In other words, running a mixed production, which may involve a considerable variation in glass panel sizes, will be awkward and insufficient in terms of the adjustment of radiation heating and convection blast.

It is an object of the present invention to eliminate or substantially mitigate the above drawbacks. One of the objectives for a method and apparatus of the present invention is to provide flexible production by virtue of heat regulation capabilities.

In order to accomplish the above objective, a method of the present invention is characterized in that at least the upper convection blast is controlled and/or regulated in various sections of the lehr in the way of a matrix by a profiling both in a conveying direction and a direction lateral thereto, and that the relative blast effects of convection blast elements successive in the conveying direction are regulated to provide a profiling in the conveying direction.

Furthermore, in order to accomplish the above objective, an apparatus applying a method of the present invention is characterized in that the upper convection blast elements are divided in the conveying direction and in a direction lateral thereto into segments or blocks which have their blast effects in various sections of the lehr adapted to be controlled and/or regulated in the way of a matrix, and that the convection blast elements are provided with associated regulators for the regulation of relative blast effects of the successive convection blast elements.

Preferred embodiments for the present invention are set forth in the dependent claims.

Figure 2:
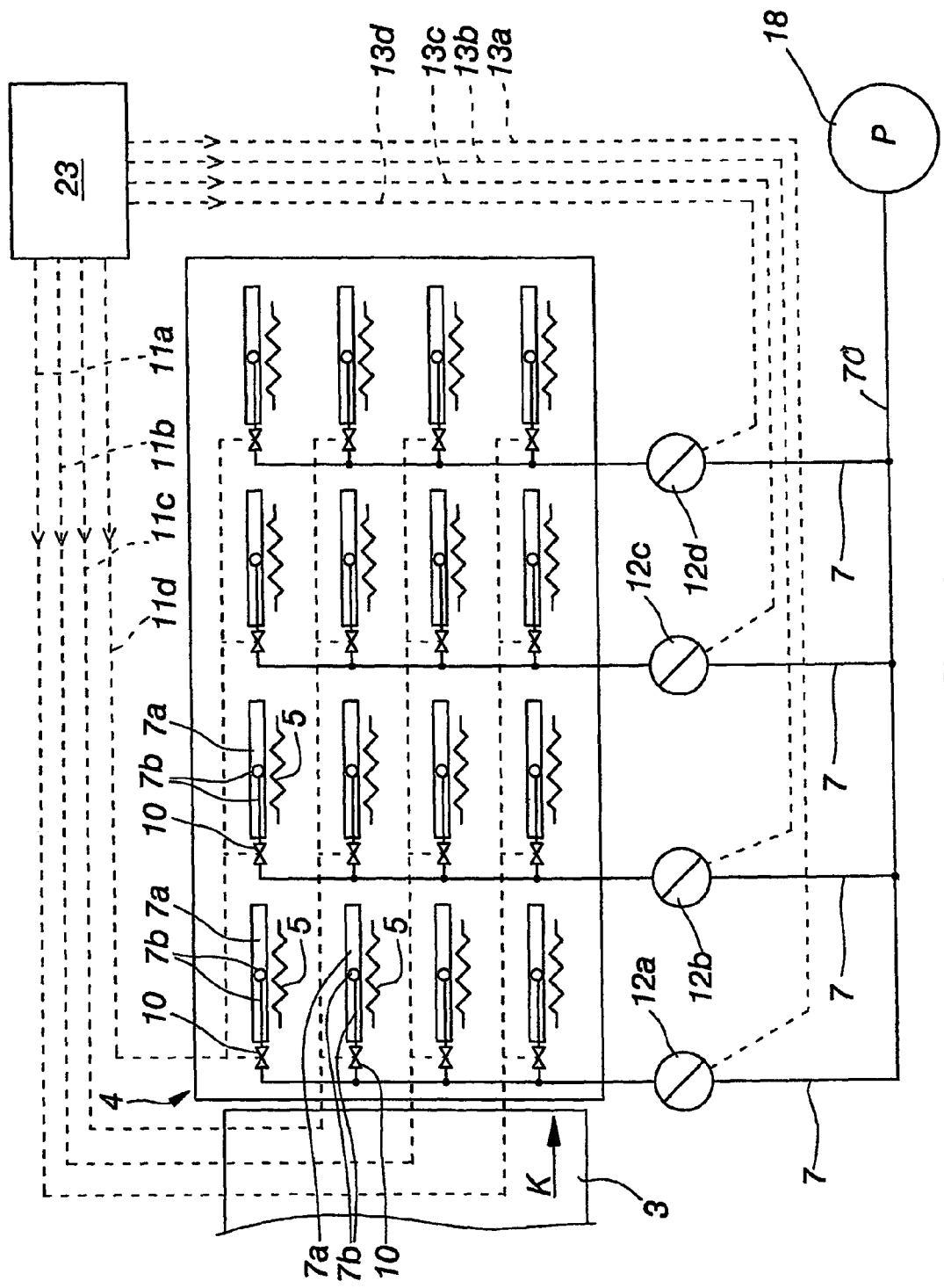
Figure 3:
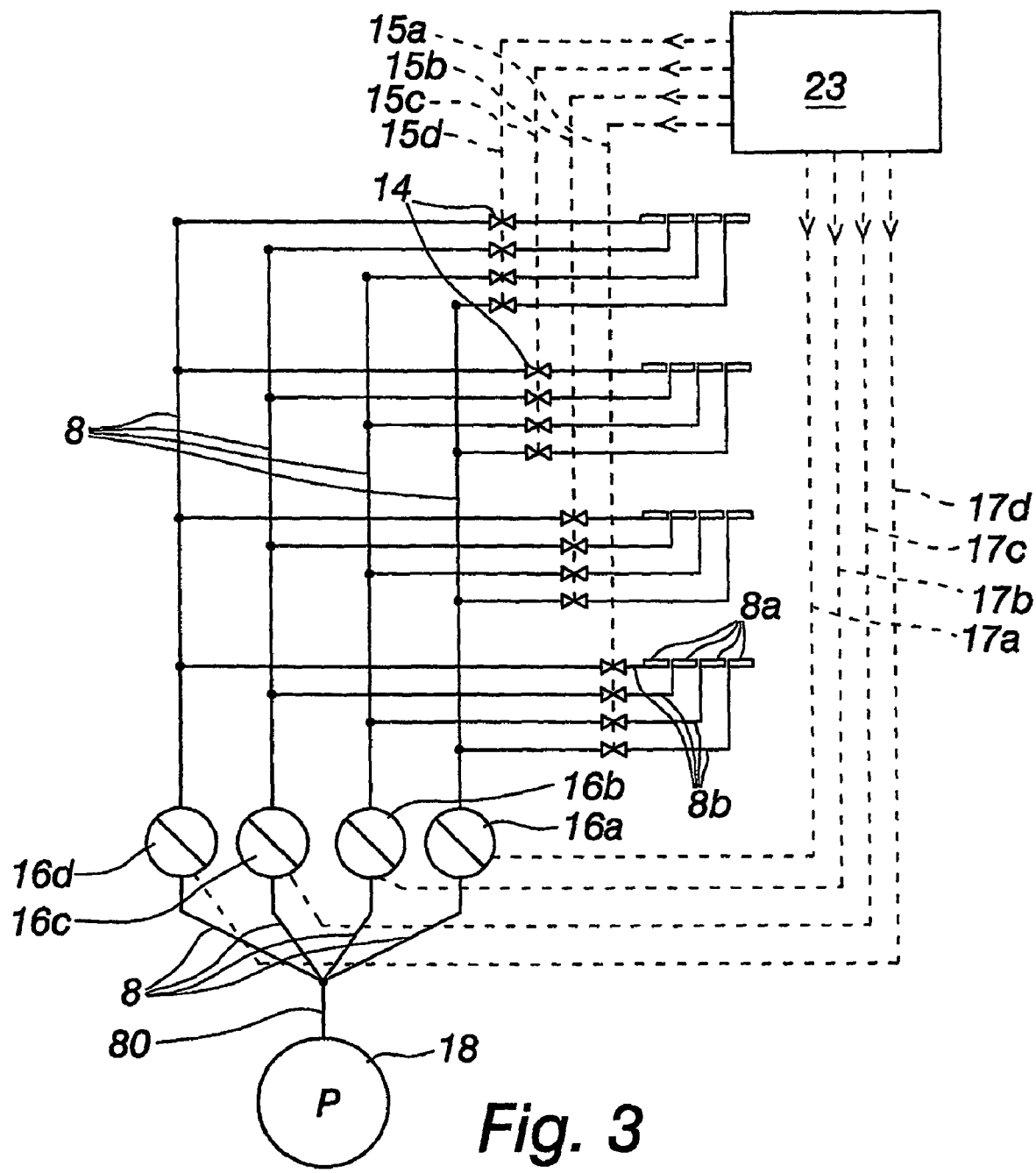

The invention will now be described in more detail with reference to the accompanying drawings, in which:

FIG. 1 shows schematically an apparatus of the invention,
FIG. 2 shows schematically a control for upper convection blast elements, and
FIG. 3 shows schematically a control for lower convection blast elements.

Hence, in reference to FIG. 1, there is shown an apparatus applying a method of the invention for heating glass panels. A glass panel is designated with reference numeral 3. The apparatus comprises a conveyor, which is indicated by reference numeral 1. The conveyor comprises successive transfer rolls 2, having their longitudinal axes set in a common horizontal plane. On top of the transfer rolls 2 the glass panel 3 is carried in a conveying direction K into a lehr 4 for heating the glass panel 3 therein.

Prior to its transfer into the lehr 4, the glass panel 3 has its pertinent information read by a detector 9 provided for this purpose. The detector 9 includes at least one line camera 9c. A light source 9a is disposed below the glass panel 3 and directed at an acute angle relative to a normal of the glass panel 3. The light source 9a is used for transmitting light (indicated by a dashed line) to the glass panel's 3 surface. The light reflected from the glass panel's 3 bottom is directed by means of a deflection mirror 9b to the camera 9c. The camera 9c transmits the image information to a control system 21, 23 of the apparatus over a transmission path 20. Image information is preferably first transmitted to a logic 21 or a corresponding processing device for interpreting and processing the image information therein. The logic interprets the light reflected to the camera as a glass panel. The image information is processed for appropriate control data or a parameter, which is transferred further to a heating control and regulation device 23 over a transmission path 22. Other prior known devices used for identifying articles can of course be employed as well.

The lehr 4 includes upper radiation heating elements 5, a number of which are disposed both side by side laterally to the conveying direction and successively along the conveying direction. According to the example shown in FIG. 2, the number of radiation heating elements 5 is four side by side and four in succession. The electric power supplied to each upper radiation heating element 5 is controlled and regulated independently by means of the control and regulation device 23, the adjusted electric powers being delivered therefrom over transmission paths 5b to the radiation heating elements 5.

Respectively, the lehr 4 is provided with lower radiation heating elements 6, a number of which are disposed both side by side laterally to the conveying direction (for example four) and successively along the conveying direction (for example four). The electric power supplied to each lower radiation heating element 6 is controlled and regulated independently by means of the control and regulation device 23, the adjusted electric powers being delivered therefrom over transmission paths 6b to the radiation heating elements 6.

The lehr 4 is further provided with upper convection blast pipes 7a for delivering convection air to the glass panel's 3 top surface. FIG. 2 illustrates schematically one inventive way of disposing the convection blast pipes 7a above the glass panel 3 in the lehr 4, as well as for controlling and regulating the same. FIG. 2 visualises a basic concept of the invention, according to which the upper convection blast pipes 7a are divided both in a direction lateral to the advancing direction of a glass panel 3 and along the advancing direction of a glass panel 3 into segments for various sections of the lehr. In each section of the lehr, the glass panel 3 can have the same spot of its top surface subjected to a desired blast effect.

In the present embodiment, each individual radiation heating element 5 is provided in its vicinity with discrete convection blast pipes 7a, such that the pipes 7a and the radiation heating elements 5 have their lengthwise dimension essentially in alignment with an advancing direction K of the glass panels 3. In a direction lateral to the glass panel's 3 advancing direction, i.e. in a cross-lehr direction, the pipes 7a are disposed in four parallel zones. Furthermore, each parallel zone is divided in the glass panel's 3 advancing direction K, i.e. lengthwise of the lehr, into four successive zones. Accordingly, the convection blast as a whole consists of sixteen components distributed in various sections of the lehr. This enables a matrix type of profiling for the glass panel 3, wherein a convection effect on the glass panel 3 in each section of the lehr 4 can be controlled and regulated independently. One preferred working example regarding the control and regulation of upper convection blast will be described hereinafter.

The blast air is preferably delivered from a compressor's pressure vessel P to a main supply pipe 70. The main supply pipe 70 is branched for four supply pipes 7. Each supply pipe 7 is in turn provided for one lateral zone of the lehr 4 to be in communication with each of the four convection blast pipes 7a of the relevant zone. This is implemented preferably by providing branch pipes 7b between the supply pipe 7 and each convection blast pipe 7a. It should be appreciated that the term pipes is used here in reference to air distribution ducts of various shapes without limiting to pipes of a circular cross-section as illustrated in the figures. The air is blasted by way of holes formed in the bottom part of a convection blast pipe 7a to the top surface of a glass panel 3 presently underneath the discussed pipe 7a (see FIG. 1). Instead of holes, it is conceivable to employ for example jet pipes as described in the Applicant's patent application PCT/FI03/00673.

In association with all four supply pipes 7 are provided pressure regulators 12a, 12b, 12c and 12d. Each individual regulator is used for regulating a blast pressure of the supply pipe 7 in communication therewith and thereby concurrently a blast pressure or a total amount of air of the four convection blast pipes 7a present in the respective lateral zone. For example, the regulator 12a is used for regulating the first lateral zone in the lehr 4. The regulators 12a, 12b, 12c and 12d are controlled according to control data supplied over respective transmission paths 13a, 13b, 13c and 13d. This enables an independent regulation regarding the blast effects of each lateral zone.

Moreover, each branch pipe 7b is fitted with valves 10. Controlling the valves 10 in a subsequently described manner enables varying the amounts and/or blasting times of convection air delivered through a convection blast pipe 7a in communication with a respective branch pipe. The valves 10 are controlled according to control data supplied from the control and regulation device 23 over transmission paths 11a, 11b, 11c and 11d. In this case, control of the valves 10 is organised by controlling simultaneously the valves 10 of those convection blast pipes 7a which are located in one lengthwise zone, i.e. essentially in succession. For example, as viewed from ahead of the lehr 4, between the regulation device 23 and the four valves 10 of a right-hand lengthwise zone is provided a transmission path 11a, by way of which the control data is delivered to each valve 10. Preferably, the valves 10 are on/off type valves but, as desired, can be supplemented with a stepless or stepped regulation for the amount of convection air.

With this apparatus, convection blasts in successive pipes can all be switched on at the same time, but the relative blast effects thereof can be regulated by means of the regulators 12a, 12b, 12c and 12d set in connection with the supply pipes 7 for providing a lengthwise profiling in the convection blast. At the same time, convection blasts in parallel pipes of a lateral zone can be switched on and off at various times for various durations for providing a lateral profiling in the convection blast.

As shown in FIG. 1, in addition to the upper convection blast pipes 7a, the apparatus includes also lower convection blast pipes 8a.

FIG. 3 depicts a schematic view for applying a convection blast from below to the glass panel's 3 bottom surface. The blast air is preferably delivered from a pressure vessel P to a main supply pipe 80 which is branched for four supply pipes 8. Each supply pipe 8 is in turn provided for one lateral zone of the lehr 4 to be in communication with each of the four convection blast pipes 8a of the relevant zone. This is implemented preferably by providing branch pipes 8b between the supply pipe 8 and each convection blast pipe 8a. The air is blasted by way of holes formed in the top part of a convection blast pipe 8a to the bottom surface of a glass panel 3 presently underneath the discussed pipe 8a (see FIG. 1).

A pressure regulator 16a, 16b, 16c and 16d set in communication with each of the four supply pipes 8 is used for regulating a blast pressure in the supply pipe 8 presently in communication with the regulator. The regulators 16a, 16b, 16c and 16d are controlled according to control data supplied from the control and regulation device 23 over transmission paths 17a, 17b, 17c and 17d. At the same time, the control applies to a blast pressure or a total amount of air of the four convection blast pipes 8a located in the respective lateral zone, as described in reference to the top-side convection blast pipes. This enables an independent regulation regarding the blast effects of each lateral zone.

Each branch pipe 8b is fitted with valves 14, which can be controlled for varying the amounts and/or blasting times of convection air delivered through a convection blowpipe 8a in communication with a respective branch pipe. The valves 14 are controlled according to control data supplied from the control and regulation device 23 over transmission paths 15a, 15b, 15c and 15d, also in this case preferably by controlling simultaneously the valves 14 of those convection blast pipes 8a which are located in one lengthwise zone, i.e. essentially in succession.

The present invention is not limited to the described embodiment, but can be modified in many aspects. For example, the number of lengthwise and lateral zones may vary, control and regulation for various zones can be provided also in other ways than connected in series by way of the branch pipes 7b, 8b. Each convection blast pipe can be controlled and regulated independently as desired.

The invention claimed is:

1. A method of heating glass panels for tempering, said method comprising:
    heating horizontal glass panels in a lehr by upper and lower convection blast and by upper and lower radiation heating,
    reading information that represents a load of the glass panels and that is used for the control and/or regulation of heating,
    controlling and/or regulating the upper radiation heating,
    controlling and/or regulating at least the upper convection blast in various sections of the lehr in the way of a matrix by a profiling both in a conveying direction and in a direction lateral thereto, dividing the upper convection blast elements in the conveying direction and in the direction lateral thereto into a plurality of segments or blocks, individually controlling and/or regulating the blast effects of the upper convection blast elements in various sections of the lehr by providing a regulator for each said segment or block, wherein the relative blast effects of convection blast elements successive in both the conveying direction and in the direction lateral thereto are regulated to provide a profiling both in the conveying direction and in the direction lateral thereto;

wherein profiling and individually controlling the blast effects of the upper convection blast elements minimizes glass distortion due to unified heating throughout the glass panel which thereby substantially prevents overheating of the leading and trailing edges; and wherein individually controlling and/or regulating the blast effects of the upper convection blast elements in various sections of the lehr comprises controlling the amount and pressure of the convection air.

2. An apparatus for heating glass panels for tempering, said apparatus comprising:

a lehr for heating the glass panels to a tempering temperature, horizontal conveyor rolls, upper and lower convection blast elements and upper and lower radiation heating elements, a detector capable of reading information that represents a load of the glass panels, control devices for controlling and/or regulating the convection blast elements and radiation heating elements by means of the load representing information, said upper and lower radiation heating elements being divided successively in a conveying direction and in a direction lateral thereto into segments which have their heating effects adapted to be controlled and/or regulated, wherein the upper convection blast elements are divided in the conveying direction and in the direction lateral thereto into a plurality of segments or blocks which have their blast effects in various sections of the lehr adapted to be individually controlled and/or regulated in the way of a matrix, and wherein each of the individually controlled and/or regulated segments or blocks in the upper convection blast elements is provided with a separate regulator for the regulation of relative blast effects of the successive and lateral convection blast elements, wherein profiling and individual control of the upper convection blast elements minimizes glass distortion due to unified heating throughout the glass panel which thereby substantially prevents overheating of the leading and trailing edges of the glass panels; and wherein the regulators provided for the upper convection blast elements are pressure regulators and wherein supply pipes to the upper convection blast elements are further provided with associated on/off valves.

* * * * *